(No Model.)
J. C. & E. F. POLAND.
STARCHING MACHINE.
No. 391,645. Patented Oct. 23, 1888.
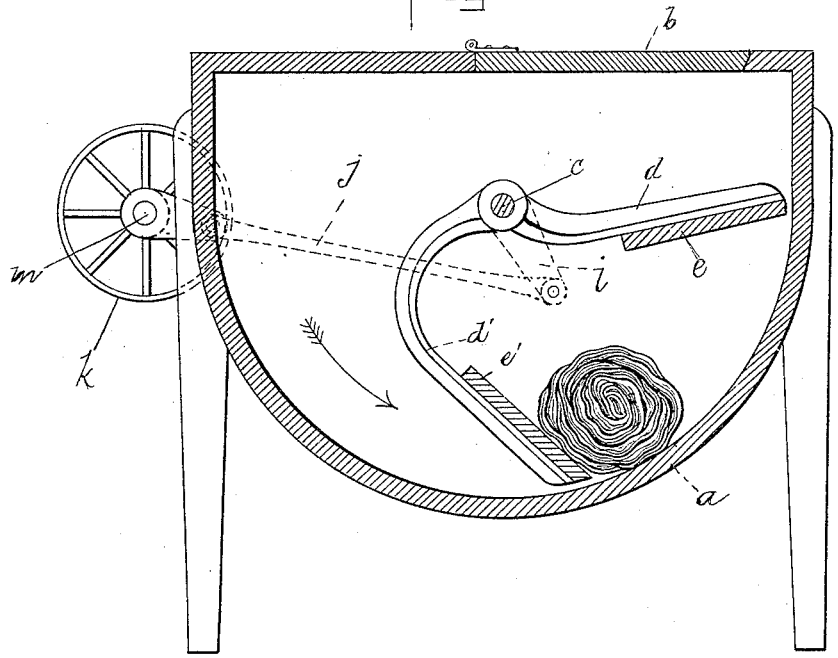
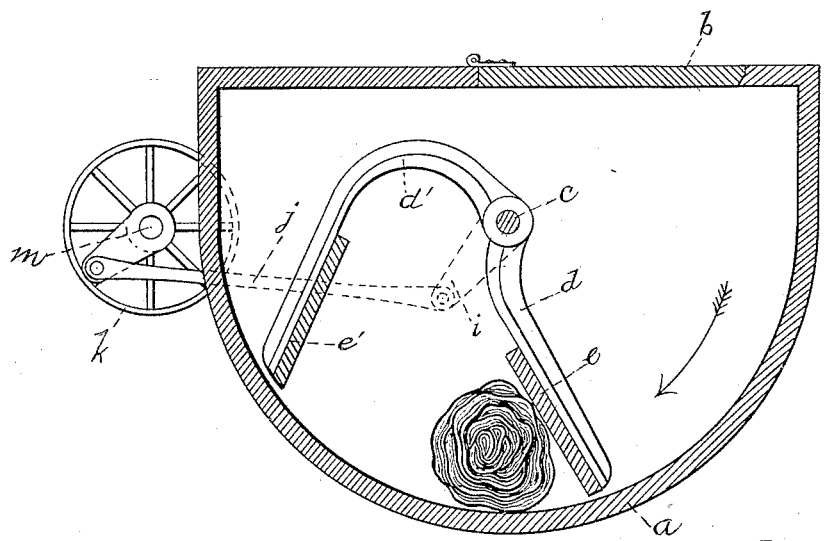
WITNESSES.
J. E. Smith
H. Brown.
INVENTOR.
J. C. Poland.
E. F. Poland.
by Wright, Brown & Crossley,
Attys.

UNITED STATES PATENT OFFICE.

JOHN C. POLAND AND EDWARD F. POLAND, OF BOSTON, MASSACHUSETTS.

STARCHING-MACHINE.

SPECIFICATION forming part of Letters Patent No. 391,645, dated October 23, 1888.

Application filed October 31, 1887. Serial No. 253,883. (No model.)

*To all whom it may concern:*

Be it known that we, JOHN C. POLAND and EDWARD F. POLAND, of Boston, in the county of Suffolk and State of Massachusetts, have invented certain new and useful Improvements in Starching-Machines, of which the following is a specification.

This invention has for its object to provide a simple and efficient machine for starching collars and cuffs and like articles; and it consists in a receptacle to contain the starch and the fabric to be starched, a shaft fitted to rotate in said receptacle, two blades or beaters secured to said shaft, and means for rocking or oscillating the shaft and beaters, the said beaters being arranged to act alternately on the fabrics, one of the beaters partly rotating the mass of articles and the other striking said mass so as to force the starch into the fabrics, as we will now proceed to describe.

Of the accompanying drawings, forming a part of this specification, Figure 1 represents a sectional view of our improved starching-machine, showing the shaft and beaters at one extreme of their oscillating movement. Fig. 2 represents a similar view showing the shaft and beaters nearly at the other extreme of their movement.

The same letters of reference indicate the same parts in both of the figures.

In the drawings, $a$ represents a tub or receptacle semicircular at its lower portion and provided with a hinged cover, $b$. Journaled in bearings at the ends of the receptacle is a shaft, $c$, which extends through the receptacle, and is provided within the latter with arms $d\ d'$, to which are attached blades or beaters $e\ e'$. The arms $d$ are so formed that the beater $e$ is nearly radial to the shaft $c$, while the arms $d'$ are so curved and inclined as to give the blade $e'$ an inclined or diagonal position relatively to an imaginary radial line from the center of the shaft $c$, the arrangement of said blade being such as that when the blade is moving forward, as indicated by the arrow in Fig. 1, its lower edge will be in advance of the upper edge, as shown. The shaft $c$ is provided at one end, outside of the receptacle $a$, with a crank or arm, $i$, which is connected by a pitman, $j$, with a crank or wheel, $k$, on a driving-shaft, $m$, the latter being journaled in bearings on the receptacle $a$ and rotated, preferably, by power. The rotation of said shaft causes the shaft $c$ and beaters $e\ e'$ to oscillate between the extremes shown in the drawings, so that a mass of collars, cuffs, &c., placed in the receptacle between the beaters will be acted on alternately by said beaters. When the beaters are moving in the direction indicated by the arrow in Fig. 1, the beater $e'$ is presented in an inclined position to the mass of fabric, its forward edge inserting itself partly under the mass and giving the latter a partial rotation each time the said blade moves in the direction stated. When the beaters are moving in the direction indicated in Fig. 2, the side of the beater $e$ strikes the mass of fabrics, forcing the starch into the meshes of the fabrics and pressing them down into the starch in the lower portion of the receptacle. It will be seen, therefore, that the goods are pushed upwardly from the bottom of the receptacle and at the same time partially turned by the blade $e'$, and then struck by the blade $e$ and pushed back into the starch. The blow given by the flat side of the blade $e$ drives the starch into the goods, and the partial turning of the mass of fabrics by the blade $e'$ causes all parts of surface of the mass to be acted on by blade $e$.

We claim—

In a starching-machine, the combination of the receptacle $a$ and the oscillating shaft $c$, provided with the beater $e'$, arranged obliquely to a radial line from the axis of the shaft, with its lower edge in advance when the beater is moving forward, whereby said beater is caused to partially rotate a mass of fabric on the inner surface of the receptacle, and the beater $e$, arranged to present its flat side to said mass when the beater $e'$ is moving backward, as set forth.

In testimony whereof we have signed our names to this specification, in the presence of two subscribing witnesses, this 25th day of October, A. D. 1887.

JOHN C. POLAND.
EDWARD F. POLAND.

Witnesses:
C. F. BROWN,
A. D. HARRISON.